United States Patent [19]

Gilbert

[11] 4,048,845
[45] Sept. 20, 1977

[54] CANNING JAR LID TEST DEVICE AND METHOD

[75] Inventor: Ray Gilbert, Anaheim, Calif.

[73] Assignee: Glass Containers Corporation, Fullerton, Calif.

[21] Appl. No.: 732,271

[22] Filed: Oct. 14, 1976

[51] Int. Cl.² ............................................. G01M 3/06
[52] U.S. Cl. ........................................................ 73/45.5
[58] Field of Search ........................... 73/40, 45.5, 49.2

[56] References Cited

U.S. PATENT DOCUMENTS

| 2,633,740 | 4/1953 | Howe et al. | 73/45.5 UX |
| 3,014,361 | 12/1961 | Black | 73/40 |
| 3,022,658 | 2/1962 | Black | 73/40 |
| 3,323,351 | 6/1967 | Helms | 73/45.5 |
| 3,418,845 | 12/1968 | Helms | 73/45.5 |
| 3,633,406 | 1/1972 | Helms | 73/45.5 |
| 3,807,219 | 4/1974 | Wallskog | 73/40 |

Primary Examiner—Richard C. Queisser
Assistant Examiner—Joseph W. Roskos

[57] ABSTRACT

A method and apparatus for testing the pressure venting characteristics of canning jar lids. A pressure chamber in the form of a mock jar finish has a canning jar lid fastened to it in the manner which the lid will be fastened under actual canning conditions. The chamber and the lid are then placed in a liquid bath which reproduces temperature conditions present during canning, and the chamber and the lid are allowed to stand in the bath until they come to the temperature of the bath. The chamber is then pressurized, and the pressure monitored until the canning jar lid is observed to vent gas; bubbles in the liquid in the bath indicating that venting is occurring. This pressure is then noted and serves as a measure of venting characteristics of the jar lid. Also disclosed is an apparatus for practicing the method.

5 Claims, 3 Drawing Figures

CANNING JAR LID TEST DEVICE AND METHOD

BACKGROUND OF THE INVENTION

The invention disclosed in this application is an apparatus and method for testing the venting characteristics of canning jar lids. As such, the invention in this application involves a specialized apparatus and method for testing the sealing capabilities of a container.

Until now, there has been no standard method for defining the qualities and characteristics of standard canning jar closures for either consumers or quality control experts. Accordingly, an apparatus and method for measuring the quality of these closures in an economical fashion has been sought, both as an aid to defining acceptable consumer standards for these goods and to aid in defining quality control parameters in their manufacture.

Prior art methods of testing canning jar lids were all virtually non-empirical. The general practice, in the past, to test canning jar lids was to can a sample substance in the normal methods of the art, including whatever heating or cooking was to be done, and then test the jar at the end of the canning process to determine if a satisfactory seal was created. This method creates numerous difficulties. Among the problems involved in this testing technique were the time and expense involved in completing a canning cycle, and the large number of uncontrolled variables in this process. In addition, a method resulting in reproduceable, standard results is desired, as there is no present method of quantitatively measuring and defining the key functional characteristics of canning jar closures. Therefore, the need for a reproduceable standardized test which will quickly and easily determine the venting characteristics of canning jar lids when they go through the canning process, has been evident. While the prior art has disclosed methods of testing metal can tops and other containers, none of these has been suitable for this particular purpose. Here disclosed is a method and apparatus for accomplishing this long felt need, which will improve evaluation and quality control of these products in the industry, and aid in defining the quality of these products for the consumer.

A significant difference between the method disclosed herein and the prior art is the fact that this method yields results which may be used to project closure performance under any combination of product and process variations. Prior art methods yielded results which represented closure performance under one set of product and process variables, and consequently lacked projectability of overall functional perormance. The test method of the preferred embodiment of the invention disclosed herein tests closures which are designed to vent during their intended use. Thus the testing techniques disclosed here allow for testing in a manner which emperically determines overall performance rather than determining performance under a single set of conditions.

SUMMARY OF THE INVENTION

A highly reproduceable method for testing venting characteristics of canning jar closures is disclosed along with an apparatus for practicing the method. The method has as its first step the formation of a closed chamber by fastening the closure to be tested on a mock jar finish adapted to receive the test closure. A base sealed to the mock bottle finish completes the chamber assembly. The jar finish may be an actual jar finish cut off and placed in a mold to form the chamber, or it may be integrally molded from a non-porous, gas and liquid impermeable material defining the chamber along with the jar finish. Also leading into the test chamber is a duct for passing air or other fluid to or from the chamber. The chamber, through this duct, is connected to a pump or other pressure varying means, so that the pressure in the chamber when the closure is in place may be varied as desired. The pressure in the chamber is read by suitable measuring means attached either directly to the chamber, or in the preferred embodiment, the reading means is attached simply to the duct leading to the chamber. A bath of mineral oil or other suitable material is then heated to a test temperature. This temperature, for the preferred application, will be approximately the same temperature at which canning normally occurs. Typically, temperatures in this event will run from 212° F to 240° F. After heating the mineral oil to the desired temperature, the test chamber assembly is immersed in the bath. This approximates the temperature environment which occurs under actual canning conditions.

In a preferred embodiment, a jar lid with a threaded band is the test closure. In this embodiment, prior to immersion in the bath, the jar closure is threaded onto the jar finish to a measured, predetermined torque. This torque is measured by conventional measuring means.

After the test assembly reaches the controlled temperature of the bath, typically after 3 to 5 minutes, the pressure in the closed chamber is increased by operating the pump. This process proceeds until the jar closure vents, which event is signaled by bubbles in the liquid or the bath. The pressure at which this occurs is noted by reading from the measurement means.

The advantages of this method over prior art methods for determining the quality and venting characteristics of a jar closure is that it yields a highly reproduceable and accurate numerical measure of the venting characteristics of the jar and closure. This measure is independent of the amount of head space left in the jar before canning, and of the material which is used to fill the jar. The control over the variables accomplished by this method includes accurately determining the effect of the torque on the jar closure, as effecting its venting characteristics, accurate control of the temperature effects on the closure, and eliminating the amount of the heading space in the jar as effecting the quality control test.

DETAILED DESCRIPTION OF THE INVENTION

Figure 1:
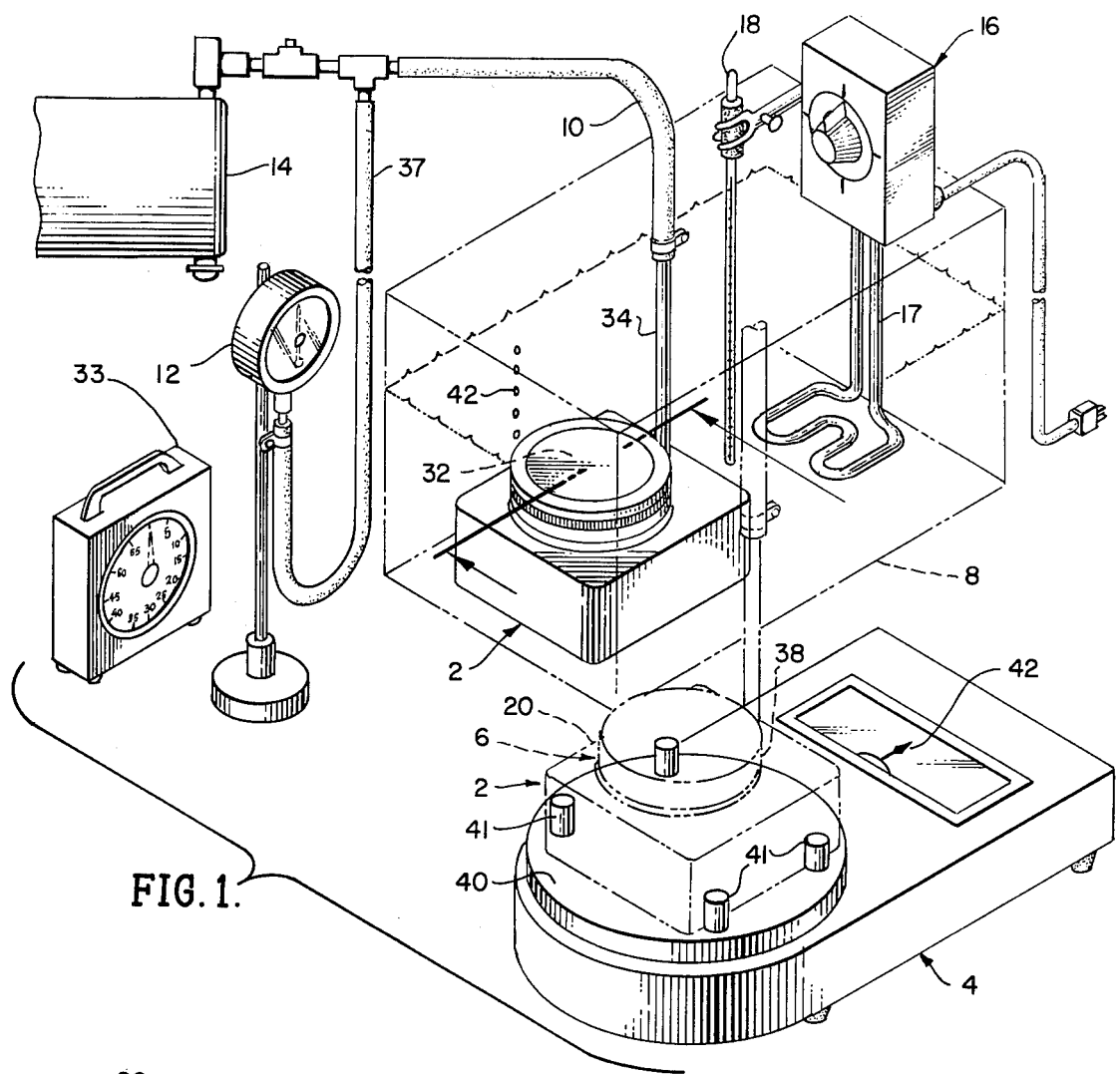
FIG. 1 illustrates a perspective view of the test apparatus.

Turning to FIG. 1, the test chamber assembly 2 is placed on a conventional apparatus for measuring torque 4. The detailed construction of the assembly 2 will be discussed shortly in connection with FIG. 2. After threading a jar closure 6 to a predetermined torque, which process will be explained in further detail, the test assembly 2 is removed from the torque measuring apparatus.

The test assembly chamber 2 is placed in a warm bath 8. The material in the bath in the preferred embodiment is mineral oil, but almost any other liquid which is suitable for laboratory use when heated is acceptable. Thus, vegetable oil could be used for the bath liquid 8.

Additionally, it is preferred that the liquid is fairly transparent, as will be subsequently explained. Leading out from the test chamber assembly 2 is a hose 10 attached to pressure gauge 12 and an air or pressure pumping means 14. In addition, the bath has a heater 16 which can be controlled, and a temperature reading means 18 enabling the temperature to be monitored. The pressure gauge 12, the air pumping means 14 and the controlled heating means 16 are all conventional apparatus which are commercially available. Any conventional pressure varying means which can be pumped to a necessary predetermined pressure and any of many methods of heating the bath, including thermocouple controlled and other automatic devices for holding a bath at a steady temperature, are suitable for practicing with this invention. With this general overall view of the apparatus which perform the test in mind, a detailed description of the various components and the test method will be made.

Figure 2:
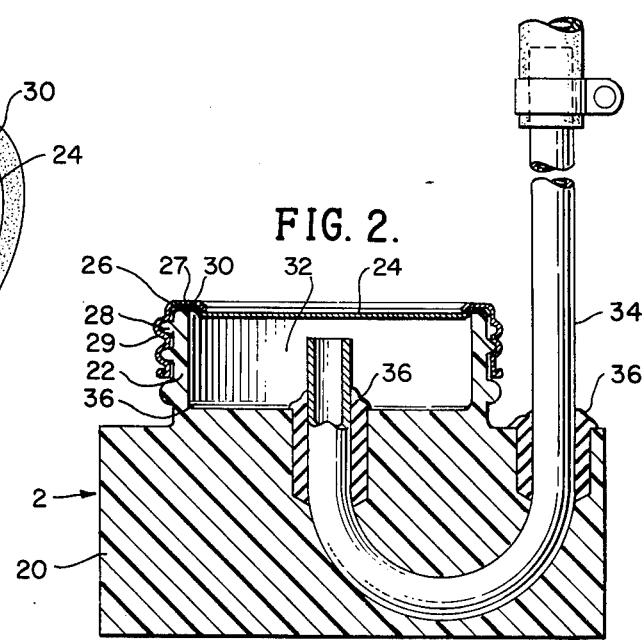
FIG. 2 is a partial sectional view of the test chamber assembly taken along the line 2—2 of FIG. 1.

Turning now to FIG. 2, the chamber assembly 2 comprises two principal parts; a base section 20 and a mock jar finish 22. "Jar finish" is taken hereinafter to refer to the upper part of the jar, including, at least, any structures on the jar which is used to hold the jar closure or lid in place. The term "mock jar finish" has been adopted here because in addition to using the upper portion of an actual jar, the chamber assembly can be molded from other materials to simulate a jar finish. As will become evident, it is essential that the jar finish is integrally attached to the base so that neither gas nor liquid can penetrate through where they meet, and that the assembly 2 be made of a material that is impermeable to the bath liquid and air.

Turning to FIG. 2, the details of the chamber assembly 2 can be understood. FIG. 2 is a sectional view of the pressure chamber assembly 2 taken along the line 2—2 of FIG. 1. As previously noted, the assembly 2 has a base section 20 and integrally attached to the base is the mock jar finish 22. In a preferred embodiment the jar finish is adapted for use with lids held in place by a threaded band 26. A typical jar closure for this embodiment is depicted in FIG. 3.

The closure 6 consists of an essentially flat metal diaphragm lid 24 with a plastic or rubber-like sealing ring 30 placed around the circumference of one of its faces. The threaded band 26 has a threaded section 29 for attachment to a jar finish, and integrally attached and substantially at a right angle to section 29 is an annular ring 27, used for clamping the lid 24 to the jar finish. The whole closure assembly 6 is usually made from metal.

Figure 3:
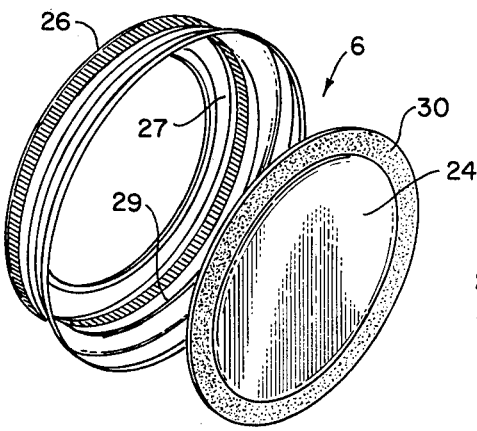
FIG. 3 is a perspective view of a typical jar closure commonly tested with this apparatus.

For simplicity, the closure of the type depicted in FIG. 3 will be specifically referred to hereafter; however, it will be evident that the apparatus could be readily modified by using a mock jar finish adapted to receive other types of jar closures and lids.

Turning again to FIG. 2, it may be seen that the lid 24 has been put on the mock jar finish 22 and the band 26 has been threaded to threads 28 to hold the lid 24 in place. Around the circumference of the lid 24 the plastic or rubber-like ring 30 seats against the jar finish to seal it to the jar finish. The lid 24, with its seal 30, the mock jar finish 22 and the base 20 of the chamber assembly define a closed chamber 32. A duct 34 is constructed to communicate between the closed chamber 32 and the outside.

In order to understand the testing method to be described below, the functioning of the two-part closure 6 as drawn in FIG. 3 under actual canning conditions should be understood. Referring to FIG. 2, the mock jar finish should be considered as if it were the upper finish of an actual jar. Placing the lid 24 within the band 26 and threading the closure assembly 6 onto the finish 22 will cause the annular ring 27 to clamp the lid 24 and seal 30 against the top part of the finish 22. When food placed inside the jar is actually canned, the heating of the goods in the jar below the finish will cause the contents in the jar to expand and create an outward pressure against the lid 24. The annular ring 27 which clamps the lid has some resiliency, and when the pressure on the lid 24 becomes great enough, portions of the lid 24 will press against the ring 27 and lift the ring 30 away from the finish to allow the air, other vapors and possibly liquids and/or solids inside the jar to vent and escape, ring 30 then resealing against the finish 22 due to pressure of ring 27. Upon cooling, the pressure inside a jar below lid 24 will drop and the pressure outside the jar then holds the lid in place.

The pressure at which the lid will vent is a function of several factors including the particular materials chosen for the construction of the closure assembly. It should be clear that the force with which the ring section 27 clamps the lid 24 with its seal 30 in place also plays a dominant role in determining the venting pressure, and that this force will be related to the maximum torque applied to the band 26 when it is threaded in place. Since every home canner will twist the band 26 in place with a different force, a knowledge of the effects of this force on the quality of the canning vacuum is crucial to improving the quality of closures used in home canning.

In the preferred embodiment, the pressure chamber assembly generally labeled 2 was made in the following fashion. The finish section of a canning jar was cut off at approximately 1 inch below the neck ring of the jar. This section was coated inside and out with a silicone rubber compound. After coating, the bottom part of the finish section 22 was cast in a two-part polyol copolymer to form the base 20. A ⅜-inch section of copper tubing, shaped in the form of a "J", was positioned as illustrated in FIG. 2, was used to form the duct 34, and cast in the polyol copolymer as was the jar finish section. A silicone sealing compound was placed where the jar finish and the tubing entered and exited from the main block 20 at, for example, point 36, to insure that no air would leak into or out of the chamber other than through the copper tubing duct 34.

It should be evident to those skilled in the art, that there would be many other methods for making the chamber assembly. For example, rather than coating a jar section, suitable plastic molds could be made. Alternatively, the entire assembly could be cast from one integral piece of metal or other relatively nonporous air and liquid impermeable materials.

Turning to FIG. 1, a preferred method of placing a threaded closure on the jar finish will be described. The assembly 2 is placed on the table of a conventional torque measuring apparatus 4 where it is held in place by the plural legs 41. The lid 24 is then placed over the opening defined by the walls 38 of the mock jar finish, and the threaded band 26 of the jar is threaded onto the chamber assembly apparatus 2, clamping the lid in place. The table 40 upon which the assembly 2 sits rotates as the top is threaded on, and the torque applied to the threaded holder is read on the apparatus meter 42. This method is a conventional torque measuring method, and any other method for threading the retaining band to a desired torque would be satisfactory. In actual test conditions, the applied torque will vary from almost zero to a maximum of 75 inch-pounds. The importance of knowing the torque to which the top is placed was explained above.

After placing the lid 24 with its band 26 tightened to a predetermined, recorded torque, the assembly 2 with its now attached closure 6 is taken and placed in the temperature bath 8. The liquid in this bath can be either mineral oil, vegetable oil or if the test apparatus is not desired to be heated past the boiling point of water, it could even be water. However, in the preferred use which duplicates canning conditions, the bath will be heated to between 212° F–240° F. It is obvious, of course, that a liquid which would boil below the temperature at which the test is conducted, would be unsuitable for the bath. Generally, prior to placing in the bath, the bath will have already been heated to the desired test temperature. This temperature is established by the heater 16, and its associated temperature reading means 18. Any conventional method of regulating the heater so that the bath may be maintained at a desired predetermined test temperature is adequate. Methods could be as simple as either a thermometer 18, with a reostate controlled heater 16, having heating elements 17 resting in the bath, as depicted in FIG. 1, to an automatically controlled heater which would be preset to the desired temperature and regulate itself.

After placing the test apparatus 2 in the heated bath, the test apparatus is allowed to come to the temperature at which the test is to be performed. By allowing the apparatus to reach the ambient temperature of the bath, there is substantially duplicated a critical aspect of the canning process in determining the pressures at which the canning jars will vent. In this fashion, thermal expansion and other factors affecting the closure 6 are readily controlled. Thus, an accurate picture of the behavior of the jar closure under actual canning conditions will result.

The duct 34 is connected by a hose 10 to a conventional air pump 14. The pump involved in this case can be any of a large number of conventional pumps provided it will supply sufficient pressure to adequately test the venting properties of the jar closure which is sought to be tested. Typically, these will not exceed 20 pounds above atmospheric pressure and a pump large enough to provide this would normally be suitable. A gauge 12 to read the pressure in the line 10 is also provided, and is connected to the chamber through hoses 37, 10, and duct 34. Since, when venting, the chamber does not loose large volumes of gas, it has been found convenient to measure the pressure directly off line 10 as it feeds into the test chamber. However, if greater precision were desired, a pressure reading directly in chamber 32 could be made by using a second duct communicating between chamber 32 and a pressure gauge.

In operation, the testing apparatus generally labeled 2 is placed in the temperature bath and allowed to sit until it reaches the ambient temperature of the bath. When the assembly 2 is first placed in the bath, this may take a considerable time. However, after warming, successive closures may be tested by removal and replacement with a waiting time of 3-5 minutes between tests. A timing means 33 may be conveniently provided for this purpose.

The bath will normally be held at customary canning temperatures, varying usually from 212° F–240° F. The pump 14 is then turned on, and the pressure in the chamber 32 is allowed to steadily increase until the closure assembly 6 begins to vent. The venting is indicated by the formation of bubbles 42 in the liquid, indicating air escaping. The pressure at which these bubbles 42 first form is read from pressure gauge 12, and can then be recorded. For this reason, a transparent liquid or almost transparent liquid is preferred for the liquid in the bath 8 to facilitate the observation of the bubbles 42 when the closure finally vents. This substantially duplicates the situation under actual canning conditions, in which pressure is generated under the closure by warming during cooking and venting from under the lid. Upon cooling, in actual canning, the lid seals tightly to form a vacuum-sealed container.

The torque is measured prior to placing the apparatus in the bath because this is a primary variable determining when the closure will vent as explained above. It is desirable that the closure vent be at the lowest pressure possible during the canning process, because in this fashion the maximum amount of air and vapors inside the glass jar would be allowed to escape and thereby ensure the presence of the highest possible vacuum. Since, in home canning, the amount of torque which the home canner will provide to the canning jar is highly variable and depends upon personal predilections of each home canner, it has become imperative that the industry exactly duplicate under various torque conditions when, in the home canning process, venting will occur. This will ensure both proper quality control by measuring a critical functional characteristic of canning lids, and encourage education to canners as to what canning techniques they must use to get the closures to vent and seal their home canned goods properly.

What is claimed is:

1. An apparatus for testing the characteristics of jar closures comprising;
    a chamber assembly, said chamber assembly including a base and a mock jar finish integrally attached thereto, said base and said mock jar finish defining a closed chamber upon fastening a jar closure to said finish, said closed chamber including a duct communicating between the interior and exterior of said chamber;
    a pressure varying means communicating through said duct into said chamber whereby the pressure in said chamber may be varied;
    means for measuring the pressure in said chamber;
    a temperature bath adapted to allow immersion of said chamber assembly into said bath, whereby said assembly may be brought to a predetermined temperature;
    means for detecting the passage of material through said jar closure upon creation of a sufficient pressure differential between the interior and exterior of said closed chamber; and
    means for measuring the torque applied to a threaded jar closure when threaded onto the mock jar finish.

2. An apparatus for measuring the pressure venting characteristics of threaded jar closures comprising:
    a chamber assembly, said chamber assembly including a base, a mock threaded jar finish integrally attached to said base, said base and mock jar finish defining a closed chamber upon threading a jar closure onto said finish, and a duct leading into the volume defined by said closed chamber;

an air pump, said pump communicating with said closed chamber through said duct, said pump capable of increasing the pressure in said closed chamber;

an air pressure gauge, said gauge communicating with said closed chamber whereby the pressure therein can be measured;

a liquid bath, said bath adapted for immersion of said chamber into said bath; and said bath including means for viewing said chamber assembly while immersed;

means for regulating the temperature of said bath; and means for measuring the torque applied to said threaded glass closure when threaded onto said threaded mock jar finish.

3. A method of testing the pressure venting characteristic of a jar closure comprising:

sealing a chamber with the test jar closure by threading the jar closure onto a mock jar finish;

measuring the torque applied to said threaded jar closure when sealing said chamber;

placing the said enclosed chamber and jar closure in a temperature controlled bath until said chamber and jar closure are substantially in temperature equilibrium with said bath;

increasing the pressure in said enclosed chamber until said jar closure vents; and detecting the pressure in said chamber at which said venting first occurs.

4. The method according to claim 3 in which said threaded jar closure comprises a substantially flat metal diaphragm lid and a threaded band fitting over said diaphragm, said band including an annular ring integrally attached thereto, whereby the metal diaphragm lid is clamped to the mock jar finish by said annular ring.

5. A method for determining the pressure venting characteristics of canning jar closures comprising:

sealing a test chamber by threading a two-part threaded canning jar closure over an opening to said chamber, said jar closure comprising a metal diaphragm lid with a circumferential rubber-like seal on one face, and a threaded band with an integrally attached annular metal ring whereby said metal lid may be clamped over the chamber opening by said annular ring upon threading said band to said chamber;

measuring the torque applied to said band when sealing said chamber;

immersing said sealed chamber and jar closure in a liquid bath heated to a predetermined temperature, said liquid being substantially transparent;

allowing said chamber to remain immersed until it reaches temperature equilibrium with said heated bath; and increasing the pressure in said sealed chamber by pumping air to the inside of the chamber through a duct until the jar closure vents, thereby creating bubbles in the liquid bath, and measuring the pressure in the chamber at which the bubbles first form by communicating a pressure measurement means with said chamber through a duct leading into said chamber.

* * * * *

UNITED STATES PATENT AND TRADEMARK OFFICE
CERTIFICATE OF CORRECTION

PATENT NO. : 4,048,845
DATED : September 20, 1977
INVENTOR(S) : Ray Gilbert

It is certified that error appears in the above—identified patent and that said Letters Patent are hereby corrected as shown below:

Column 8, line 6, "for" should be --of--.

Signed and Sealed this

Tenth Day of January 1978

[SEAL]

Attest:

RUTH C. MASON
*Attesting Officer*

LUTRELLE F. PARKER
*Acting Commissioner of Patents and Trademarks*